United States Patent [19]
Bolosky et al.

[11] Patent Number: 5,991,804
[45] Date of Patent: Nov. 23, 1999

[54] CONTINUOUS MEDIA FILE SERVER FOR COLD RESTRIPING FOLLOWING CAPACITY CHANGE BY REPOSITIONING DATA BLOCKS IN THE MULTIPLE DATA SERVERS

[75] Inventors: William J. Bolosky, Issaquah; Dwayne R. Need, Kirkland; Siddhartha Debgupta, Seattle, all of Wash.

[73] Assignee: Microsoft Corporation, Redmond, Wash.

[21] Appl. No.: 08/879,405

[22] Filed: Jun. 20, 1997

[51] Int. Cl.⁶ ........................................... G06F 13/00
[52] U.S. Cl. ..................... 709/221; 709/208; 709/209; 709/213; 709/220; 709/223; 709/231; 709/245; 707/10
[58] Field of Search ................ 395/200.43, 200.5, 395/200.53, 200.61, 200.75, 200.38; 707/10; 709/208, 209, 213, 220, 221, 223, 231, 245

[56] References Cited

U.S. PATENT DOCUMENTS

| | | | |
|---|---|---|---|
| 5,502,836 | 3/1996 | Hale et al. | 711/170 |
| 5,559,764 | 9/1996 | Chen et al. | 369/30 |
| 5,719,983 | 2/1998 | Henderson et al. | 386/70 |
| 5,724,539 | 3/1998 | Riggle et al. | 711/100 |

*Primary Examiner*—Le H. Luu
*Assistant Examiner*—Jason D. Cardone
*Attorney, Agent, or Firm*—Lee & Hayes, PLLC

[57] ABSTRACT

A continuous media file server has a controller connected to multiple data servers. Each data server supports at least one storage disk. Data files are distributed across the data servers so that data blocks of the data files are stored on each of the storage disks according to a present striping layout. The file server employs declustered mirroring techniques in which data is redundantly copied and stored on other disks and servers to guard against component failure. In the event that the storage capacity of the media file server is changed (i.e., by adding or removing one or more storage disks), the continuous media file server is restriped in a three-phase process. During the first phase, the controller determines a new striping layout of the data files across the storage disks which accounts for the capacity change. The controller then creates an ordered work list describing the data block moves that a corresponding data server needs to make to convert from the present striping layout to the new striping layout. The controller distributes the list to the data servers. The order of the latter two phases depends on whether disks are being added or removed. In one of the two final phases, the data servers reorganize the redundancy data for the new disk configuration. In the other of the two final phases, the data servers execute their respective work lists and communicate with one another to move the data blocks to the appropriate disks in conformance with the new striping layout.

67 Claims, 8 Drawing Sheets

DISK

| Disk Location | D0 | D1 | D2 | D3 | D4 | D5 | D6 | D7 |
|---|---|---|---|---|---|---|---|---|
| 0 | 1 | 1 | 1 | 1 | 1 | 1 | 1 | 1 |
| 1 | 1 | 1 | 1 | 1 | 1 | 1 | 1 | 1 |
| 2 | 0 | 0 | 0 | 1 | 1 | 1 | 1 | 1 |
| 3 | 1 | 1 | 1 | 1 | 1 | 1 | 1 | 1 |
| J-1 | 1 | 1 | 1 | 1 | 1 | 1 | 1 | 1 |
| J | 0 | 0 | 0 | 1 | 1 | 1 | 1 | 1 |
| J+1 | 1 | 1 | 1 | 1 | 1 | 1 | 1 | 1 |

BIT MAP

50

CONTINUOUS MEDIA FILE SERVER FOR COLD RESTRIPING FOLLOWING CAPACITY CHANGE BY REPOSITIONING DATA BLOCKS IN THE MULTIPLE DATA SERVERS

TECHNICAL FIELD

This invention relates to continuous media file servers that provide data streams at a constant data rate to a large number of simultaneous users. This invention also relates to methods for cold restriping data across a continuous media file server following a change in system configuration in which storage capacity is increased or decreased.

BACKGROUND OF THE INVENTION

A continuous media file server is designed to serve continuous data streams, such as audio and video data streams, at a constant rate to multiple clients. As an example, a file server might supply digital data streams in the 1–10 megabits-per-second range to thousands of clients simultaneously.

A continuous media file server developed by Microsoft Corporation is based on a distributed architecture in which the data files are distributed across numerous data servers and storage disks. More particularly, the data files are striped across all of the storage disks and all of the data servers on the system. This striping arrangement helps avoid disproportionate use of storage disks and data servers in the likely event that some content is more popular than others. For example, the top ten percent of movies ordered by popularity might garner 70% of the load, while the remaining 90% of the content attracts only 30% of the viewers. Without striping across all disks and servers, the system might overburden the disks and data servers holding popular content while leaving other disks and data servers underutilized.

Because all of the data files are stored on all of the disks, the pattern in which the data files are striped depends on the number of disks and the number of data servers in the file server. As a result, adding or removing storage disks or data servers is not a simple task. In general, changing the number of disks in the file server can result in having to move nearly all of the file data from one disk to another or from one data server to another. For example, consider a file server having ten data servers, each with one storage disk, which holds one data file having a length of 1000 blocks. The first block of the file is on disk 0, the next block is on disk 1, and so forth until the 10$^{th}$ block is stored on disk 9. The 11$^{th}$ block is then stored on disk 0, the 12$^{th}$ block on disk 1, and so forth.

Now, suppose the operator adds a new data server with another disk to the file server. This increases the capacity of the file server by one disk to a total of 11 disks. Assuming that the data file still has its first block on disk 0, the file will need to be reconfigured so that the 11$^{th}$ block is now stored on the new eleventh disk rather than wrapping to the old first disk 0, where it formerly resided. Similarly, the 12$^{th}$ block will have to move from disk 1 to disk 0, and so forth throughout the length of the file. Removing data servers or disks presents a similar set of problems.

The inventors have developed a way to reconfigure the file server in an efficient manner following a change in system capacity.

SUMMARY OF THE INVENTION

A continuous media file server has a controller connected to multiple data servers. Each data server supports at least one storage disk. The data files are distributed across the data servers so that data blocks of the data files are stored on each of the storage disks according to a present striping layout. The file server employs declustered mirroring techniques in which data is redundantly copied and stored on other disks to guard against component failure. In the event that the storage capacity of the media file server is changed (i.e., by adding or removing one or more storage disks), the continuous media file server is reconfigured to accommodate that change in storage capacity.

The reconfiguration process is carried out in three phases. The controller performs the first phase, and the data servers perform the last two phases in parallel. The order of the last two phases depends upon whether one or more storage disks are being added or removed from the system.

During the first phase, the controller determines a new striping layout of the data files across the storage disks that accounts for the capacity change. The controller then creates an ordered work list for each of the data servers. Each work list describes the data block moves that the corresponding data server makes to convert from the present striping layout as it exists prior to the capacity change to the new striping layout that accounts for the capacity change. The controller distributes the lists to the respective data servers.

During one of the last two phases, the data servers reorganize the redundancy data according to the new striping layout.

During the other of the last two phases, the data servers execute the work lists concurrently and communicate with one another to efficiently move the data blocks to the appropriate disks in conformance with the new striping layout. For each entry on the list, a data server reads a particular data block from a source disk and sends a write request to another data server having a destination disk to which the data block is to be moved. The second data server determines whether it is safe to write the data block into the destination location on the destination disk. Such a write will be safe if the contents of the destination location (if any) have already successfully been transferred elsewhere. If the destination location is ready to receive the data, the second data server retrieves the particular data block from the first data server and writes the data block to the destination disk.

The file server implements fault tolerance mechanisms to protect against component failure and whole system failure during the restriping process. In the event that a disk or data server fails during restriping, the data server containing the mirrored data takes over for the defective component and uses the mirrored data to reconstruct the lost data.

To guard against whole system failure during restriping, the data servers transfer the data blocks in the order specified in the work lists generated in the first phase and log entries as the data blocks are moved to the new locations. Each storage disk maintains a pair of pointers, a write pointer to the last data block written and a log pointer to the last data block that has been logged as being moved. In the event of system failure, the system restarts at the log pointer and proceeds from there.

Various methods for reconfiguring a continuous media file server following a change in storage capacity are also described.

BRIEF DESCRIPTION OF THE DRAWINGS

FIG. 2 shows a striping layout in which data blocks from data files are striped across all of the storage disks in the array prior to any capacity change.

FIG. 7 shows a new striping layout in which data blocks from data files are striped across all of the storage disks in the array including the new storage disks.

DETAILED DESCRIPTION OF THE EXEMPLARY EMBODIMENT

Figure 1:
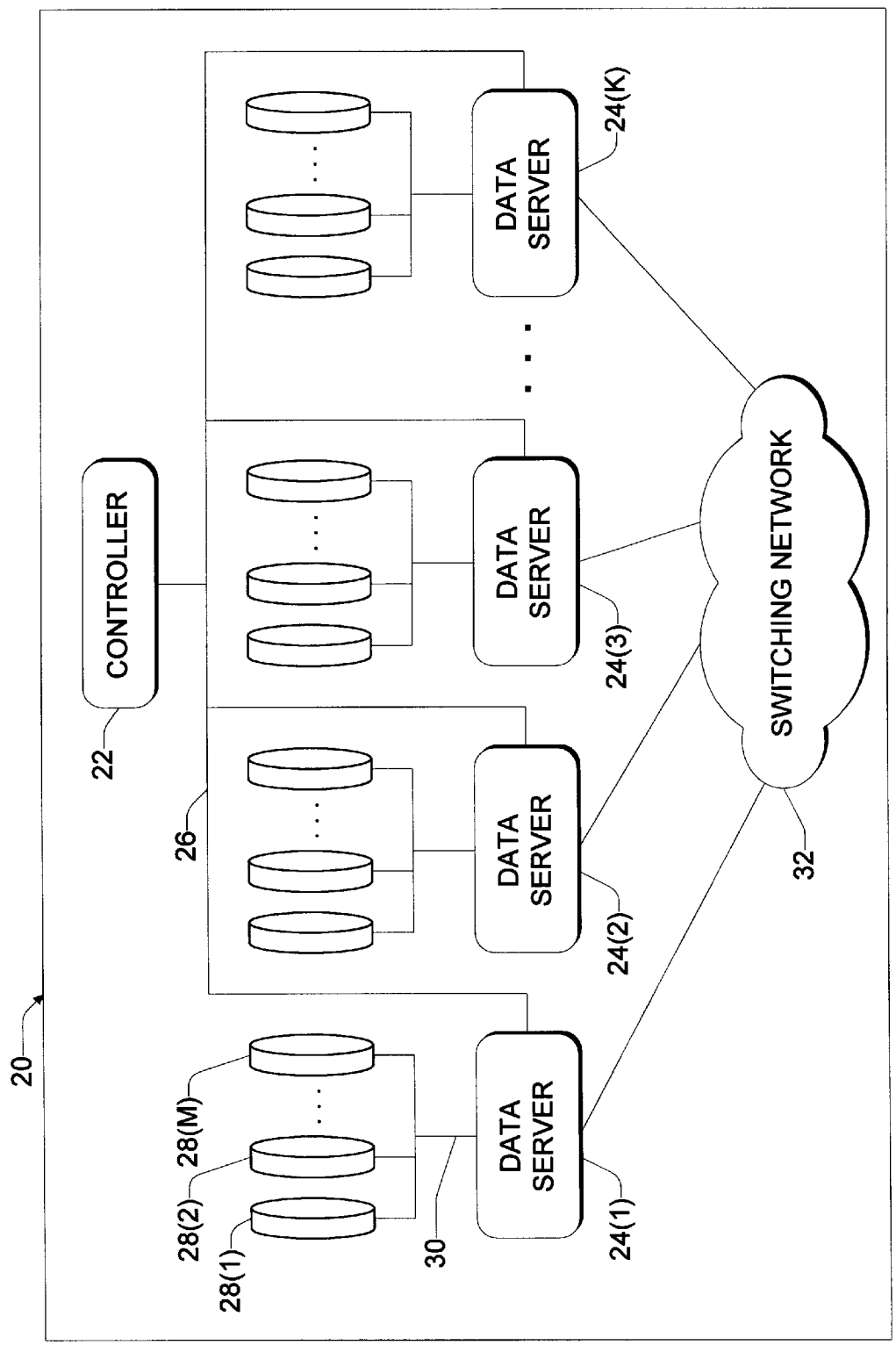
FIG. 1 is a diagrammatic illustration of a continuous media file server having a controller and multiple data servers.

FIG. 1 shows a continuous media file server 20 which is designed to serve continuous data streams at a constant data rate to a large number of simultaneous users. The file server 20 is particularly suited for serving digital audio or video files that are to be played continuously at a constant rate. The continuous media file server 20 can be implemented in different contexts. For instance, the file server 20 might function as a head end server in an interactive television (ITV) system which serves audio and video files over a distribution network (e.g., cable, satellite, fiber optic, etc.) to subscriber homes. The file server 20 might alternatively operate as a content provider that distributes data files over a network (e.g., Internet, LAN, etc.) to multiple client computers.

The continuous media file server 20 has a central controller 22 connected to multiple data servers 24(1), 24(2), 24(3), . . . , 24(K) via a low bandwidth control network 26. Alternately, the controller 22 may be connected to the data servers 24 through the switching network 32. Each data server 24 supports at least one storage disk, as represented by storage disks 28(1), 28(2), . . . , 28(M) connected to data server 24(1). The disks 28 are attached to their respective data server 24 via one or more SCSI (Small Computer System Interface) buses 30. In addition to SCSI busses, the data servers may employ other peripheral interconnects, such as Fiber Channel or EIDE. The number and configuration of storage disks is flexible, but within a given file server 20 all data servers 24 support the same number of storage disks 28. The storage disks can store large amounts of digital data, with example disk capacities of many Gigabytes. The storage capacity of the entire media file server 20 consists of the usable storage space on the storage disks. An operator can change the storage capacity of the file server by adding or removing one or more storage disks to or from each data server, or adding or removing one or more of the data servers to which the disks are connected.

The data servers 24 are connected to a high-speed switching network 32 which distributes the data files from the storage disks to multiple clients. The network 32 also provides high bandwidth, parallel communication between the data servers 24. As an example, the network 32 can be implemented using fiber optics and ATM (Asynchronous Transfer Mode) switches.

The continuous media file server 20 is a scalable, distributed system for providing large numbers of constant rate data streams. As an example, the file server 20 can supply digital data streams in the 1–10 megabits-per-second range simultaneously to tens of thousands of clients. The distributed architecture of numerous data servers 24 connected via the high-speed switched network 32 achieves a large aggregate bandwidth for the task.

It is likely that some pieces of content will be more popular than others. For example, the top ten percent of movies ordered by popularity might garner 70% of the load, while the remaining 90% of the content attracts only 30% of the viewers. To avoid disproportionate use of storage disks 28 and data servers 24 (i.e., by overburdening the disks and data servers holding popular content while leaving other disk and data servers underutilized), the continuous media file server 20 stripes all of the data files across all of the storage disks 28 and all of the data servers 24. In that way, each viewer, regardless of the data file being viewed or heard, spreads the load over all of the storage disks 28 and data servers 24.

Figure 2:
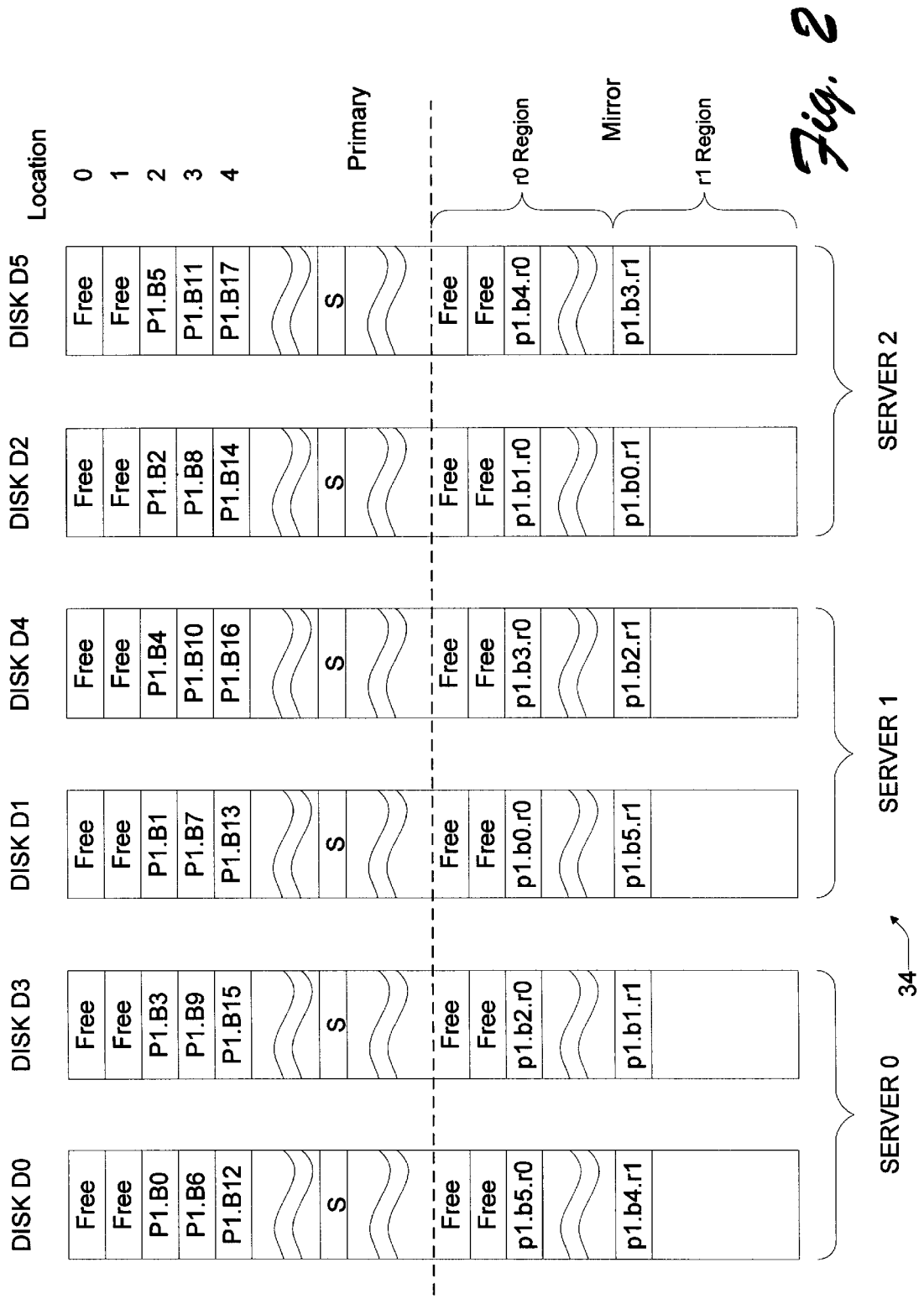
FIG. 2 is a diagrammatic illustration of a storage disk array of the continuous media file server.

FIG. 2 shows an example file server disk array 34 consisting of six storage disks D0–D5 supported by three data servers 0–2. Storage disks D0 and D3 are attached to data server 0, storage disks D1 and D4 are attached to data server 1, and storage disks D2 and D5 are attached to data server 2. In this implementation, the disk array 34 is configured to support mirrored redundancy wherein data is stored in two places. Conceptually, each disk is divided in half, with one-half of the disk dedicated to primary data and one-half of the disk dedicated to mirrored data.

Each disk stores data in blocks. As used herein, the term "block" means a unit of data or an amount of physical space allocated on a disk to hold that unit of data. A data block can be expressed in terms of bytes (with an example block size being 1 Megabyte) or in terms of content (with one block holding approximately one second of video or audio data). The physical block locations are numbered along the side of disk D5 to provide reference for discussion.

In FIG. 2, a data file for program P1 is striped across every storage disk D0–D5 and every server 0–2. The first data block B0 for program P1, designated as "P1.B0," is stored on disk D0 of server 0 at location 2. The second data block P1.B1 is stored on disk D1 of server 1 at location 2. The third data block P1.B2 is stored on disk D2 of server 2 at location 2. The striping continues disk-by-disk across contiguous disks. When the last disk D5 is reached, the striping pattern wraps and continues with block P1.B6 being located on disk D0 of server 0 at location 3.

The FIG. 2 illustration shows sequential data blocks stored at the same physical block address on contiguous disks. For instance, data block P1.B1 is at disk D1, location 2, server 1, and is followed by the next data block P1.B2 at disk D2, location 2, server 2, and so on. However, other patterns are possible. The striping pattern generally prescribes that the data blocks are sequentially ordered across the ordered disks, but the sequential blocks need not reside at the same physical block number on adjacent disks. Accordingly, sequential data blocks can reside at entirely different physical block locations within the contiguous disks. Pointers can be used to sequence through the disk array from block to block, or alternatively, a map can be maintained at the controller 22 or in the data servers 24 to track the physical locations of the data blocks.

Some of the blocks may be unused. FIG. 2 shows a set of free blocks at block locations 0 and 1 on the disks. In addition, the system reserves at least one spare block S on each disk. The free blocks and spare blocks are used in the restriping process, as explained below in more detail with reference to FIGS. 5–7.

Over time, components are expected to fail. To anticipate this possibility, the primary data is duplicated on the mirrored half of the disks. In the illustrated implementation, the file server employs a declustered mirroring technique in which the redundant data is broken into multiple pieces and spread over more than one disk. While mirror redundancy requires each byte to be stored twice, the declustering technique results in much less than one-half of the system bandwidth being reserved for operating in a partially failed state. This is because when a storage disk or data server fails, several other disks or data servers share the work of making up for the failed component. As a result, the continuous data stream can be efficiently served in real time even if the storage disk or data server carrying the primary data is faulty.

FIG. 2 shows the declustered mirroring format in which each primary data block is broken into multiple pieces. The number of pieces is dictated by a decluster factor. Here, the decluster factor is two, meaning that the primary data block is broken into two pieces. For instance, the primary data block P1.B0 is broken into two redundancy pieces designated as "p1.b0.r0" and "p1.b0.r1." The redundancy pieces for the data blocks are stored on the mirror half of storage disks other than the primary disk carrying the primary data blocks. Preferably, the redundancy pieces are also stored on storage disks attached to different data servers to permit loss of the entire data server supporting the primary data, yet still be able to serve the data file. If the disk with the primary data fails as a result of disk or server error, the mirrored data on the other disks and servers is used. In FIG. 2, the mirrored pieces p1.b0.r0 and p1.b0.r1, which correspond to data block P1.B0 (server 0, disk D0, block 2), are stored on disk D1 of server 1 and disk D2 of server 2. The mirror half of the storage disks is divided into regions depending on the decluster factor. In this example, the decluster factor is two, resulting in two regions in the mirror half. The mirrored pieces for ".r0" are all stored in the first region, and the mirrored pieces for ".r1" are all stored in the second region as shown. Other declustered mirroring patterns may also be used.

To play a data file, the file server 20 serves the data blocks sequentially from the storage disks D0–D5, one block at a time. That is, the file server 20 serves data block P1.B0, followed by data block P1.B1, and so forth. The striping arrangement enables continuous and even cycling of the disks and servers when the program P1 is played. As the program blocks are read in order—P1.B0, P1.B2, etc.—the storage disks are accessed in order: D0, D1, . . . , D5, D0, D1, etc. Additionally, the servers are continuously used in order: server 0, server 1, server 2, server 0, etc. The controller 22 coordinates the data servers 24(1), 24(2) . . . 24(K) to keep their clocks synchronized so that they may provide a continuous stream of data blocks at a constant rate. The switching network sequences among the servers to output a continuous data stream.

The data servers 24 provide a rotating schedule to guarantee that the clients' service demands do not conflict with one another. If a client requests to start receiving a data file and the resources to send that file are busy, the file server delays sending the data file until the resources are free. The clients being served data files move from disk to disk and server to server in lock step. Once a client begins receiving a file, the resources will continue to exist until the client reaches the end of the file or requests that the play stop.

U.S. Pat. No. 5,473,362, entitled "Video on Demand System Comprising Stripped (sic) Data Across Plural Storable Devices With Time Multiplex Scheduling," which was filed on Nov. 30, 1993 and issued on Dec. 5, 1995, in the names of Fitzgerald, Barrera, Bolosky, Draves, Jones, Levi, Myhrvold, Rashid and Gibson, describes the striping and scheduling aspects of the continuous media file server 20 in more detail. U.S. Pat. No. 5,867,657, entitled "Distributed Scheduling in a Multiple Data Server System," which issued Feb. 2, 1999, in the names of Bolosky and Fitzgerald describes a method for distributing the schedule management among the data servers 24 in more detail. U.S. patent application Ser. No. 08/437,935, entitled "Tolerating Component Failure in a Continuous Media Server," which was filed May 9, 1995, in the names of Bolosky, Fitzgerald, and Osterman and was continued as U.S. patent application Ser. No. 08/705,075 and is now issued as U.S. Pat. No. 5,699,503 (Dec. 16, 1997), describes in more detail the techniques employed to operate a continuous media server when some storage disks 28 or data servers 24 have failed. These applications, which are assigned to Microsoft Corporation, are hereby incorporated by reference.

Because all of the data files are stored on all of the storage disks 28 across all of the data servers 24, the striping pattern depends on the number of storage disks 28 and the number of data servers 24 in the file server 20. Changing the storage capacity of the file server 20 by adding or removing storage disk(s) and/or data server(s) requires reconfiguring the file server to a new striping arrangement. The process of moving the data blocks around within the file server in response to configuration changes is called "restriping."

One aspect of this invention concerns a method for reconfiguring, or restriping, the continuous media file server following a capacity change in which one or more storage disks and/or data servers are added or removed. The method is performed while the file server is unavailable for normal services, and hence can be said to be a "cold" restriping process.

The cold restriping method is carried out in three phases. The first phase is performed by the controller 22 and involves building an ordered work list for each disk 28 supported by the data servers 24(1), 24(2), 24(3), . . . , 24(K). The work lists describe the data block moves that the data servers 24 perform to convert from the present striping layout, as it exists prior to the capacity change, to the new striping layout which accounts for the capacity change. The controller 22 distributes these lists to the respective data servers 24. The second and third phases are performed by all of the data servers 24 in parallel. The order of the final two phases depends on the particular restriping operation that is being attempted, such as whether restriping is the result of adding or removing one or more disks. One phase involves executing the work lists to move the data blocks to conform to the new striping layout. The other phase concerns reorganizing the mirrored data blocks in view of the striping layout. The first phase is unlikely to significantly impact the total run time of the restriping process, even though it is a serial process, because the latter two phases involve actual movement of file data whereas the first phase does not.

The method is implemented as distributed processes at the controller and data servers. More particularly, one implementation of the method involves software components stored in memory and executed at processors located at the controller 22 and at each data server 24(1)–24(K).

Figure 3:
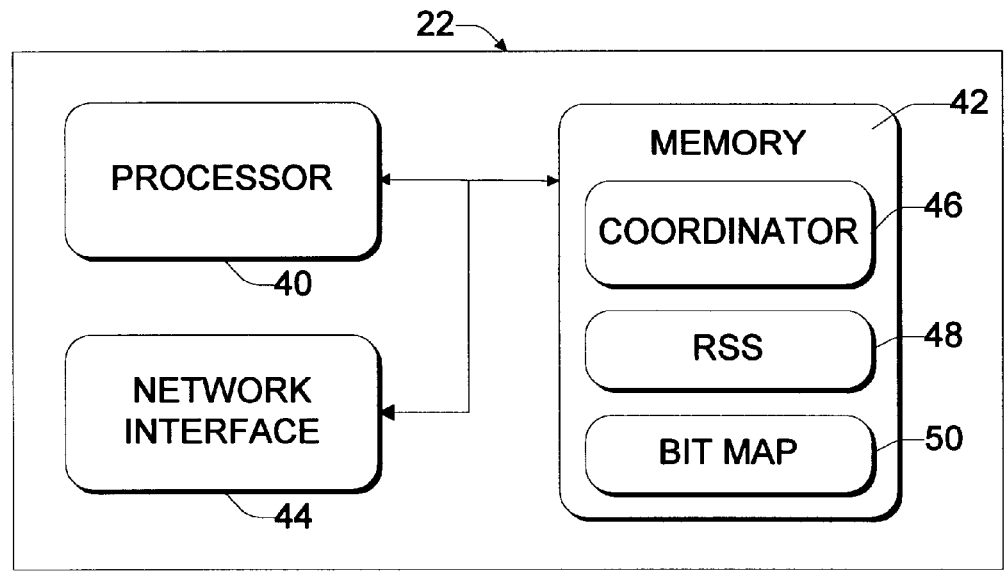
FIG. 3 is a block diagram of the controller used in the continuous media file server.

FIG. 3 shows an example implementation of the controller 22 in more detail. It includes a processor 40, memory 42 (e.g., ROM, RAM, hard disk, floppy disk, CD-ROM, etc.), and a network interface 44 for connection to the network 26. The controller 22 manages and coordinates operation of the data servers 24. The controller 22 has a user request processing and data server coordinating program 46, which is stored in memory 42 and executed on processor 40, to coordinate the data servers during distribution of the data files to the multiple clients. The controller 22 has a restriping service software (RSS) program 48, which is stored in memory 42 and executed on processor 40, to generate a new striping layout when the operator changes the storage capacity of the file server 20. The controller 22 also maintains a bit map 50 of the new striping layout, as will be described below in more detail with reference to FIG. 8.

Figure 4:
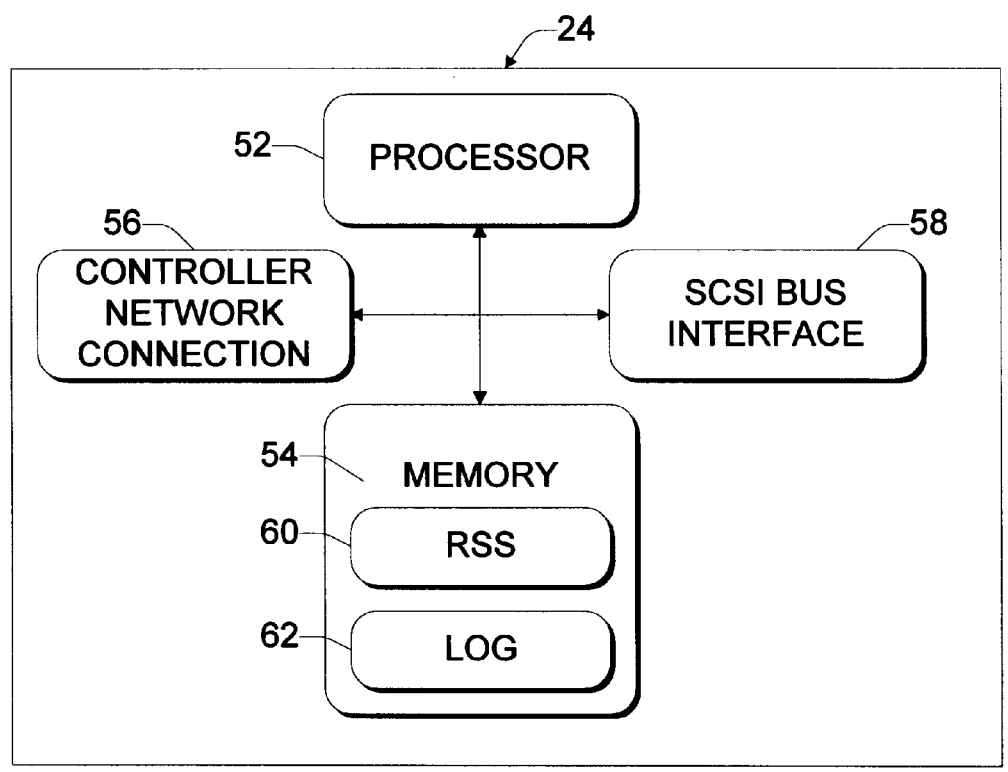
FIG. 4 is a block diagram of an individual data server used in the continuous media file server.

FIG. 4 shows an example implementation of one of the data servers 24 in more detail. It has a processor 52, memory 54 (e.g., ROM, RAM, hard disk, floppy disk, CD ROM, etc.), a controller network connection 56 for connection to the network 26, and a peripheral interface 58 for connection to the peripheral interconnect 30. The memory 54 also represents a boot disk that is used for various tasks, as explained below in more detail. The data server 24 has a restriping service software (RSS) program 60 stored in memory 54 and executable on the processor 52 which cooperates with the RSS program 48 in the controller 22. The RSS program 60 executes the work lists generated by the controller 22 to move data blocks during restriping and to realign the redundancy blocks. The data server 24 also maintains a log 62 that logs the movement of data blocks during restriping.

Figure 5:
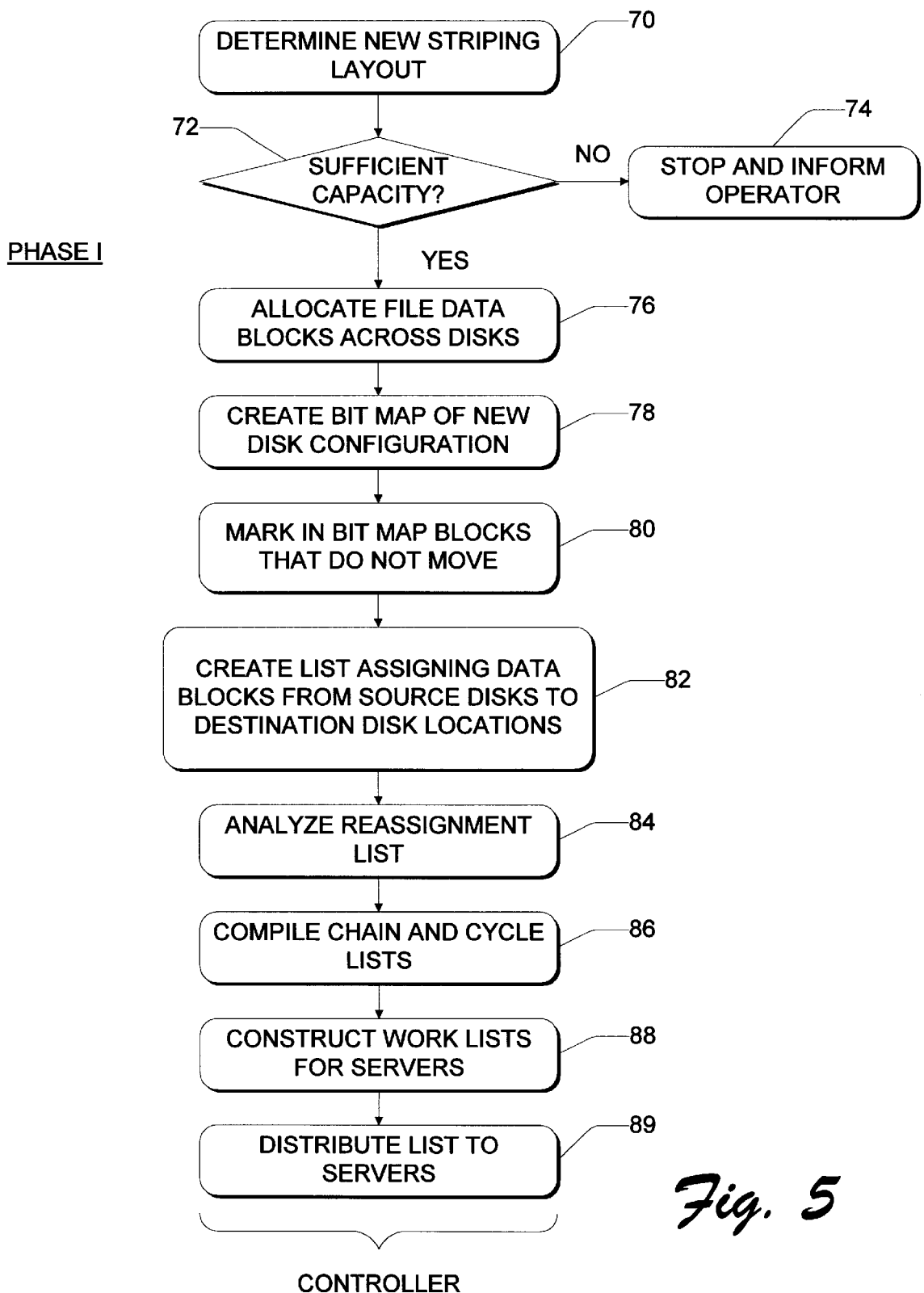
FIG. 5 is a flow diagram showing steps performed by the controller during reconfiguration of the file server to account for a change in storage capacity.
Figure 6:
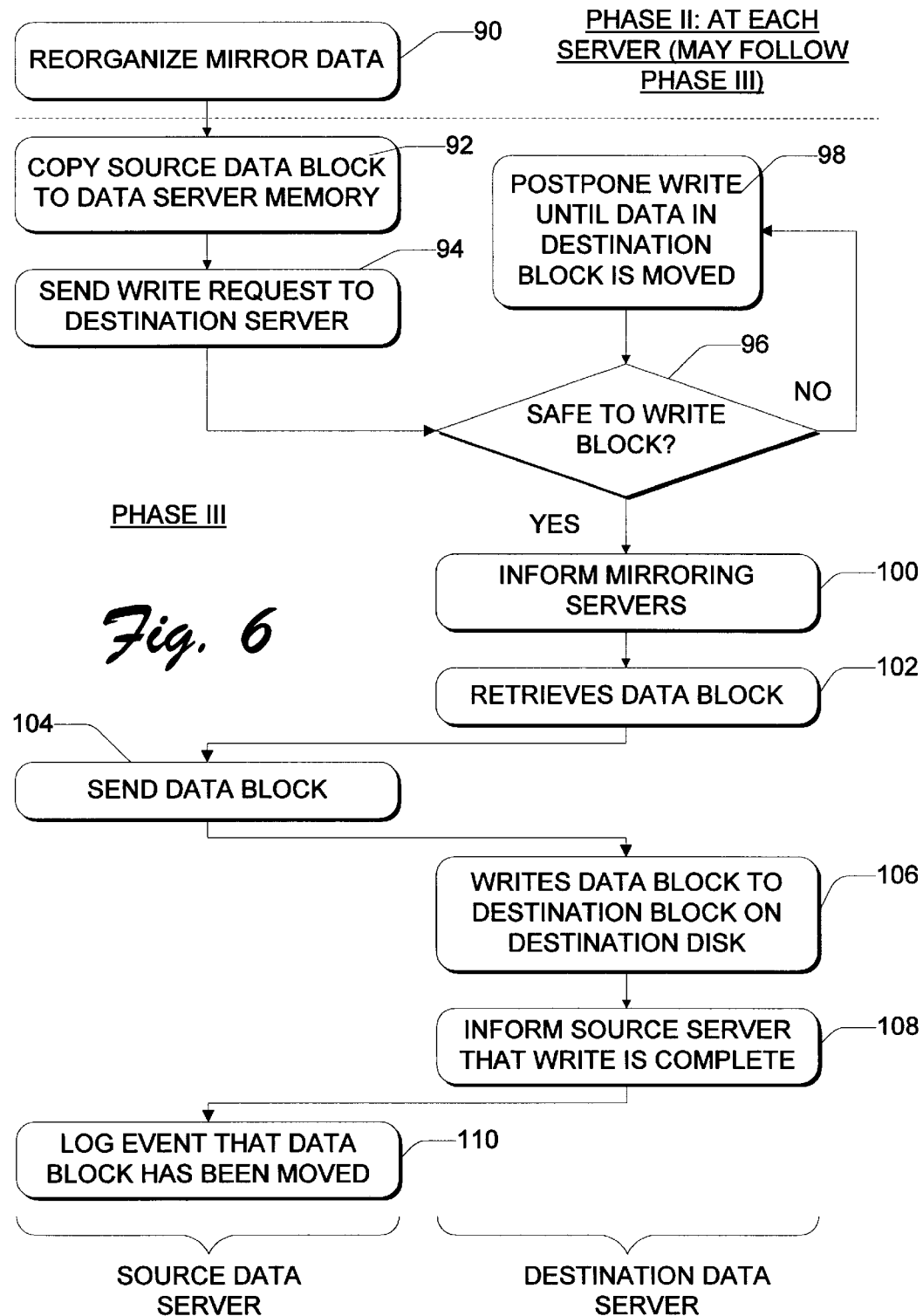
FIG. 6 is a flow diagram showing steps performed by each of the data servers during the restriping process.

FIGS. 5 and 6 show steps in the method for configuring the continuous media file server following a change in storage capacity, such as by adding or removing storage disk(s). FIG. 5 shows the steps performed by the controller 22 during the first phase of the restriping process. FIG. 6 shows the steps performed in parallel by the data servers 24(1)–24(K) during the second and third phases of the restriping process.

Figure 7:
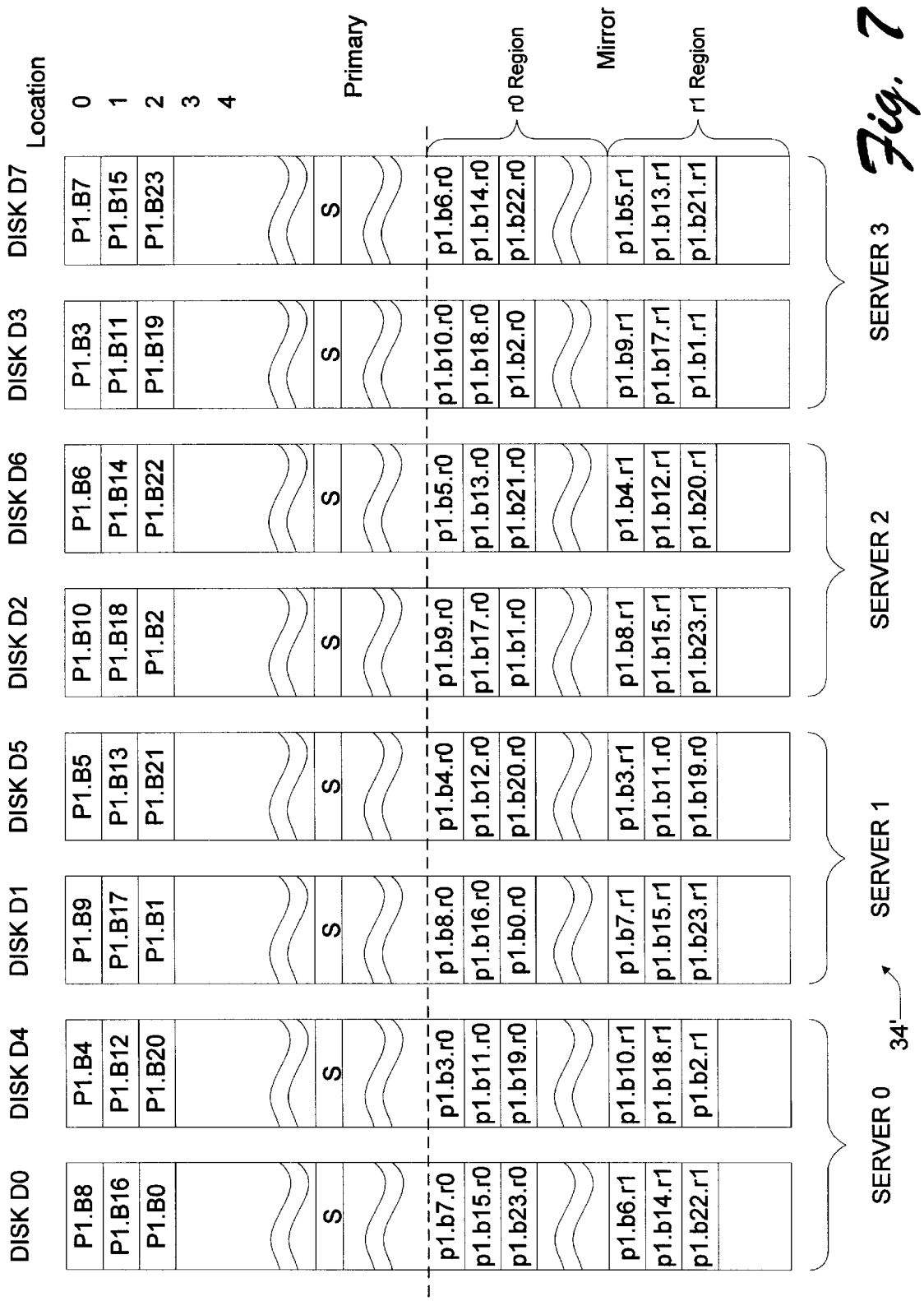
FIG. 7 is a diagrammatic illustration of the FIG. 2 storage disk array, but incorporating an additional data server and two additional storage disks.

To illustrate the restriping service, suppose that the operator increases the storage capacity of the continuous media file server 20 by addition one server with two storage disks. FIG. 7 shows the file server disk array 34' with a new server 3 and two new storage disks. The disks are renumbered from D0 to D7. That is, server 0 supports storage disks D0 and D4, server 1 supports storage disks D1 and D5, server 2 supports storage disks D2 and D6, and server 3 supports storage disks D3 and D7. The re-labeling of the disks is handled through a translation table so that the same storage disk that was once D3 is now D4, but no physical data blocks are moved as a result of re-labeling the storage disks.

With the additional storage disks, the media file server 20 is restriped to distribute the data blocks across all of the storage disks, including the new disks D6 and D7. The steps of FIGS. 5 and 6 describe the restriping process within the context of this increased capacity. It is noted, however, that the method may also be used in those cases where the operator reduces the storage capacity, such as by removing one or more storage disks.

At step 70 in FIG. 5, the controller 22 determines a new striping layout for the new file server configuration. Part of this determination involves an evaluation as to whether there is sufficient capacity to accommodate the data files (step 72 in FIG. 5). If the number of storage disks is reduced rather than increased, there may be insufficient space on the new disk array to hold the data files. Restriping is not possible unless some data files are deleted or more disk space is added. If there is insufficient capacity to restripe all of the data files across the disk array (i.e., the "no" branch from step 72), the continuous media file server 20 informs the operator that a new striping layout is infeasible (step 74 in FIG. 5).

On the other hand, if the capacity is sufficient (i.e., the "yes" branch from step 72), determining a new striping layout is relatively straightforward. The controller 22 acts as if it is writing the data files onto an entirely new system configuration for the first time and allocates blocks accordingly. For each data file, the controller 22 chooses a storage disk 28 to hold the first block of the data file, and then sequentially allocates the rest of the data blocks for the data file one-by-one across sequential disks (step 76 in FIG. 5). When the last disk is reached, the controller 22 wraps back to the first disk and continues the sequential disk-by-disk striping.

This allocation process is exhibited in FIG. 7. The controller 22 begins by placing the first block of program 1—P1.B0—on storage disk D0, and then proceeds to allocate the next block P1.B1 to the next disk D1, block P1.B2 to the next disk D2, block P1.B3 to the next disk D3, and so on. After the data block P1.B7 is allocated to the disk D7, the controller 22 returns to the first disk D0 and continues with the next data block P1.B8.

There are several possible approaches to choosing where to locate the first data block of each data file. One approach is to locate the first block of the first data file on the first storage disk D0, and then start the first block of each subsequent file on the storage disk that follows the disk holding the last block of the previous data file. With this allocation technique, the data blocks are spread evenly across the disks. The number of used blocks on any one disk will differ from the number used on any other disk by at most one block. A slight variation from the first approach is to start the first data file on the storage disk that holds the first block in the old striping layout.

A second layout strategy is to optimize the starting locations of the data files so that each data file starts on the disk that will result in moving the least number of data blocks during the second phase of the restriping process. A third approach is to consider the popularity of the data files, and particularly small data files. Short popular data files are arranged on different disks and different data servers to spread out any hot spot loading. It is noted that if a data file has significantly more blocks than the number of storage disks in the file server, any starting disk works nearly as well as any other.

At this point in phase one, the controller 22 has developed a partial list of data blocks from the many files and the locations in which they are to reside following restriping to comply with the new striping layout. For instance, the controller 22 has determined that the ninth data block of program P1—P1.B8—will reside on disk D0 of server 0 in the new striping layout. However, the controller has not yet determined how the block P1.B8 is moved from its present location (disk D2, location 3) in the existing striping layout to its future location in the new striping layout (disk D0, location 0). That is, the controller 22 has not yet assigned a specific location on disk D0 to which the block P1.B8 is to be moved.

To promote clarity, the descriptor "source" means the location that the data blocks presently reside in accordance with the present or existing striping layout prior to capacity change. In this manner, each data block presently resides on a "source location" of a "source disk" of a "source data server." The descriptor "destination" means the location that the data block is to be moved in order to comply with the new striping layout. That is, the data block is moved to a "destination location" of a "destination disk" of a "destination data server."

Figure 8:
FIG. 8 is a diagrammatic illustration of a bit map of the new striping layout which is maintained in the controller of FIG. 3.

To assist in the allocation process, the controller 22 constructs a bit map 50 which reflects the new disk array configuration, inclusive of the additional storage disks D6 and D7 (step 78 in FIG. 5). A portion of the bit map 50 is shown in FIG. 8. The bit map 50 has a bit entry representing each available block on all of the storage disks after the capacity change. In the FIG. 8 illustration, the bit entry consists of a single bit, although multiple bits per entry may be used. The bit entry has a first value, such as a binary "0," when the corresponding disk array block has a block assigned to it in the final layout. Conversely, the bit entry has a second value, such as a binary "1," when the corresponding disk array block has not yet had any data assigned to it. The controller modifies the bit map 50 throughout the process of assigning source blocks to destination disk blocks.

At step 80 in FIG. 5, the controller identifies any blocks that are on the same disk in the initial and final configuration, and marks these locations as used in the bitmap 50. For example, the data blocks P1.B0, P1.B1, and P1.B2 remain at the same location 2 on disks D0, D1, and D2, respectively, in both the initial configuration (FIG. 2) and the final configuration (FIG. 7). FIG. 8 shows the bitmap 50 at a state when all unmoving blocks are marked. It is noted that data blocks other than the first few might likewise reside on the same storage disk under both the old and new striping layouts. Inherent in the conversion from an old sequential striping pattern to a new one, the new striping pattern periodically maps the data blocks onto the same storage disks where they presently reside. This is represented in bit map 50 by the value change for bit entries in location J of disks D0–D2, indicating that the corresponding data blocks are likewise in their final place.

The next step 82 in FIG. 5 is to further develop the list to include entries that assign particular data blocks to specific destination disk locations. The controller then assigns destination locations to all of the blocks that move from disk to disk. The controller first assigns all of the locations that are free in the initial assignment, and indicates this in the bitmap. Once all of the free locations are used up on a particular disk, the controller assigns locations sequentially from the beginning of the disk to the end, skipping over any locations that are marked as already assigned in the bitmap. There is no particular reason beyond convenience for the controller to assign the remaining locations sequentially; however, preferentially using the free locations results in increased parallelism in the restriping phase.

FIG. 2 shows all of the unused blocks gathered at the top of the storage disks at locations 0 and 1. This arrangement is only for illustration purposes; in practice, the free space is distributed throughout various locations on the disks. The storage disks, or the data servers, maintain free lists which track the free unused blocks.

In phase three of the restriping process, the data servers operate in parallel to move the data blocks. The assignments of data blocks to specific destination disk locations helps establish a particular order for executing the block moves so that data blocks presently residing in locations are safely moved before being overwritten by data blocks that are destined to occupy the same locations. The data block assignments can be realized as block movement summaries that become entries on the work list. There is one block movement summary for each data block. A block movement summary specifies a source location on a source disk where a particular data block presently resides and a destination location on a destination disk where the particular data block is to be moved. The block movement summary is represented as follows:

<Destination Disk, Destination Location>←<Source Disk, Source Location>

For illustrative purposes, the source disk and source location are given from the disk arrangement following the reconfiguration. That is, the values used in the source portion of the assignments are derived from the FIG. 7 layout, and not the FIG. 2 layout. In practice, the <Source Disk, Source Location> elements are in terms of the old (FIG. 2) layout and the <Destination Disk, Destination Location> elements are in terms of the new (FIG. 7) layout. This is necessary because when data disks are removed, there is no new name for the source disks that are being removed.

Consider, for example, the assignment of a particular data block P1.B8 to convert it from the existing striping layout of FIG. 2 to the new striping layout of FIG. 7. In the old striping layout (FIG. 2), block P1.B8 resides at source location 3 of source disk D2 of server 2, which happens to coincide with the relabeled disk/server as well. In the new striping layout (FIG. 7), the same block P1.B8 will reside at destination location 0 of destination disk D0 of server 0. The block movement summary for this data block is represented as follows:

Data P1.B8: <D0, L0>←<D2, L3>

As a result of the assignments, the work list has numerous entries in the form of block movement summaries. A list holding entries of the first 18 data blocks of program P1 in FIG. 2 is shown below. All values for destination and source are derived from FIG. 7.

Data Block: Destination←Source

Data P1.B0: Unmoving
Data P1.B1: Unmoving
Data P1.B2: Unmoving
Data P1.B3: <D3, L0>←<D4, L2>
Data P1.B4: <D4, L0>←<D5, L2>
Data P1.B5: <D5, L0>←<D6, L2>
Data P1.B6: <D6, L0>←<D0, L3>
Data P1.B7: <D7, L0>←<D1, L3>
Data P1.B8: <D0, L0>←<D2, L3>
Data P1.B9: <D1, L0>←<D4, L3>
Data P1.B10: <D2, L0>←<D5, L3>
Data P1.B11: <D3, L1>←<D6, L3>
Data P1.B12: <D4, L1>←<D0, L4>
Data P1.B13: <D5, L1>←<D1, L4>
Data P1.B14: <D6, L1>←<D2, L4>
Data P1.B15: <D7, L1>←<D4, L4>
Data P1.B16: <D0, L1>←<D5, L4>
Data P1.B17: <D1, L1>←<D6, L4>

The blocks that are marked "Unmoving" start and end on the same disk, and so require no action. The controller 22 does not allocate the locations in which these blocks reside to new blocks; otherwise, unmoving blocks are ignored for the rest of the reconfiguration process.

After the block movement summaries are derived, the controller 22 analyzes the general reassignment list (step 84 in FIG. 5). The controller 22 considers every location on any disk in either the old or new striping layouts. Any location may or may not be used in the old layout, and may or may not be used in the new layout. All locations on the new disks D6 and D7, for instance, are unused in the old layout. Similarly, all locations on a removed disk are unused in the new layout. The controller 22 can ignore any location that is unused in both the old and new striping layouts. The remaining locations will have blocks copied into them or blocks copied from them, or both, during the actual restriping process.

Consider a location F that is initially free in the existing striping layout, but is not finally free in the new layout. Because the location is initially free, there is no data in it that needs to be copied out. Because it is not free in the new layout, there is some block that is assigned to be moved from another location, say block A, to the final location F. The location holding A is clearly not free in the existing layout (since it contains data to be moved to location F), and it may or may not be free in the new layout depending upon whether some other block is mapped into it. If the location holding A is not free in the new striping layout, there is some block that is assigned to be moved from another location, say block B, to the location A. The controller 22 can continue the quest until it locates an ending block, say block E, that is in a location that is finally free in the new striping layout. This creates a finite-length chain, as follows:

F←A←B← . . . ←E

Said another way, a chain begins with a destination location F that is initially free and ends with a source location E that is finally free. The chain is guaranteed to end because no block is mapped to more than one location, and the beginning of the chain is a location F that is initially empty and so mapped to no other block.

A chain captures the data dependencies that are followed to ensure correct restriping. Copying block B to the location that initially holds block A is permissible if and only if the copy of block A to location F has already occurred. If block B is copied to the location initially holding A before block A is copied to location F, the contents of block A would be overwritten and forever lost. Copying block A to location F is permissible any time before block B is copied to the location initially holding block A. There are no dependencies between the operations in any chain and those in any other chain.

Using the program data in FIG. 7, an example chain is given as follows:

<D0, L0>←<D2, L3>← . . .

Here, location 0 of disk D0 is initially free. According to the assignment mapping of the above table, the data block in disk D2 at location 3 is to be copied into disk D0 at location 0. This chain continues until an end location, which is finally free in the new striping layout, is reached.

Not all used locations are necessarily on a chain. There is another possibility, called a "cycle", in which no locations are free in either the existing or new striping layouts. In a cycle, the locations are all mapped onto one another. In other words, a cycle begins with a destination location and ends with a location block that is identical to the destination location. For example, a cycle is formed when location A is mapped to location B, which is mapped to location C, which is mapped again onto the first location A. A cycle is represented as follows:

A←B←C← . . . ←A

Cycles are more complicated to handle than chains. On its face, a cycle is guaranteed to deadlock: there is no operation in the cycle that can be performed without first having performed some other operation in the cycle. To handle a cycle, the system 20 reserves enough space to store a single block on each disk. FIG. 2 shows a spare location S on each disk; alternately, the reserved location may be on the boot disk within the data servers 24. When the controller 22 detects a cycle, the controller uses the spare location S on the data server holding one of the locations, say location A, as an initial holding location to break the cycle. That is, the contents of location A are first copied to spare location $S_A$ and then location A is free to receive contents from location B and so on throughout the rest of the cycle. When the end of the cycle is reached, the contents of spare location $S_A$ are copied to the last location. This series of moves is as follows:

$S_A$←A←B←C← . . . ←$S_A$

A broken cycle is not a normal chain because the spare location $S_A$ appears at both ends of the move series. Additionally, there can theoretically be multiple cycles that desire to use the same spare location $S_A$. Accordingly, the data servers 24 guarantee that cycles using the same spare location are processed one at a time.

Every location on the disk array is either unmoving (because it is in the same place in the initial and final layouts), unused in both layouts, part of a chain, or part of a cycle. In practice, most locations are either unused or part of a chain. Unmoving locations occur with a frequency of about one out of every n blocks, where n is the larger of the number of disks in the initial or final layouts. Cycles are quite rare.

At step 86 in FIG. 5, the controller 22 compiles a list of chains and a separate list of any cycles. At step 88 in FIG. 5, the controller 22 takes the general lists and constructs server work lists for individual data disks. These sub-lists are initialized to be empty and subsequently filled according to chain and cycle move operations.

For each chain, the controller 22 takes the first link in the chain (e.g., move operation F←A) and assigns it to the work list for the data disk holding the destination location F. In the continuing example of FIG. 7, the first link in the chain, i.e., <D4, L0>←<D5, L2>, is assigned to the server work list for the data disk 4. After the controller 22 processes the first links of each chain, the controller 22 starts again with the first chain, this time taking the second move operation (e.g., A←B) and assigning the task to the destination server. The controller 22 continues until all of the move operations in all of the chains have been assigned to the appropriate destination disk. The process results in the following server work lists:

| | Server Chain List 1 for Data Server 0 | |
|---|---|---|
| Depth 1 | Data P1.B4: | <D4, L0> ← <D5, L2> |
| | Data P1.B8: | <D0, L0> ← <D2, L3> |
| Depth 2 | Data P1.B12: | <D4, L1> ← <D0, L4> |
| | Data P1.B16: | <D0, L1> ← <D5, L4> |
| | Server Chain List 2 for Data Server 1 | |
| Depth 1 | Data P1.B5: | <D5, L0> ← <D6, L2> |
| | Data P1.B9: | <D1, L0> ← <D4, L3> |
| Depth 2 | Data P1.B13: | <D5, L1> ← <D1, L4> |
| | Data P1.B17: | <D1, L1> ← <D6, L4> |
| | Server Chain List 3 for Data Server 2 | |
| Depth 1 | Data P1.B6: | <D6, L0> ← <D0, L3> |
| | Data P1.B10: | <D2, L0> ← <D5, L3> |
| Depth 2 | Data P1.B14: | <D6, L1> ← <D2, L4> |
| | Data P1.B18: | <D2, L1> ← |
| | Server Chain List 4 for Data Server 3 | |
| Depth 1 | Data P1.B3: | <D3, L0> ← <D4, L2> |

|         | Data P1.B7:  | <D7, L0> ← <D1, L3> |
| Depth 2 | Data P1.B11: | <D3, L1> ← <D6, L3> |
|         | Data P1.B15: | <D7, L1> ← <D4, L4> |

Cycles are handled somewhat differently. For each cycle, one server in the cycle is chosen to be the server with the spare block. The entire cycle is assigned to that server, as follows:

Server Cycle List 1 for Data Server
$S_A \leftarrow A \leftarrow B \leftarrow C \leftarrow \ldots \leftarrow S_A$ At step 89 in FIG. 5, the controller 22 distributes the general work list, or more particularly, the relevant server work lists to the appropriate data servers 24(1)–24(K) over the network connection 26. The controller's assigning of free locations before used ones helps to reduce the length of the chains, and so to increase the parallelism of the restripe phase.

In a later phase, the servers will get the work lists and process them in order, as is explained below with reference to FIG. 6. The servers proceed through their respective lists according to the depth order. In this manner, all depth one entries are handled first, followed by depth two, and so on. As a result, the work lists will never cause a deadlock. A "deadlock" occurs when multiple servers are all stopped waiting for one another. Ignoring cycles for the moment, for a server to be stopped waiting for another server, the stopped server must be trying to execute a move in a chain for which some previous move (in the same chain) has not yet been made. Because all lower depths are already complete, the server processing the lowest depth is guaranteed not to be blocked. Accordingly, the system can always make progress.

For cycles, the server designated to handle the entire cycle begins by copying the leading block into the spare location, and then hands the cycle list to the next server in the cycle. The next server performs its moves, shortens the list, and hands the shortened cycle list to the next server. This continues until the cycle list returns to the starting server, which moves the contents out of the spare location to the destination location. Because no cycle depends on any other cycle or any chain, each cycle can be processed without blocking, thereby avoiding any deadlock.

This completes phase one of the restriping process, which is performed entirely at the controller 22 by the computer-implemented RSS program 48.

The next two phases—mirror reorganization and work list execution—are performed in an order according to the particular restriping operation that is being performed. For instance, when one or more disks are being removed, the server work lists are executed first followed by mirror reorganization. If the mirror data was rearranged prior to implementing the work lists, there would be a window of vulnerability between the time when the mirror data is moved and the time when the data is copied off of the disk(s) that is being removed. During this window, the loss of a disk could result in the unrecoverable loss of part of the data on that disk.

Alternatively, when a disk is being added, the mirror reorganization is performed first followed by execution of the server work lists. This order is preferred because prior to mirror reorganization, the new disk does not initially have valid redundancy data for the data being transferred to it. This condition is not desirable because the copy of the block data on the newly added disk would be the only copy anywhere, and if the newly added disk failed, the data would be irretrievably lost.

In our continuing example, a new server 3 and two new disks D6 and D7 are added (FIG. 7). Accordingly, the mirror reorganization phase is performed first. This involves reorganizing the mirrored data blocks in view of the striping layout. The work list execution phase is performed last, which involves executing the work lists to move the data blocks to conform to the new striping layout.

FIG. 6 shows the steps in the second and third phases of the restriping process in which the data servers 24 reorganize the mirror data and execute their work lists to actually move the data blocks from their present locations to their new locations which comply with the new striping layout. In particular, the mirror reorganization and the work lists execution steps in FIG. 6 are performed by each data server 24(1)–24(K) in parallel with the others.

At step 90 in FIG. 6, the data servers 24 remap the mirror data according to the new striping layout. FIG. 7 shows the remapped mirror data for a decluster factor of two. The first data server 24(1) begins with the first data block P1.B0 on disk D0 and moves its two redundancy pieces p1.b0.r0 and p1.b0.r1 respectively onto the next two storage disks D1 and D2 (and next two servers 1 and 2). The data servers then proceed to the next data block P1.B1 on disk D1 and move redundancy pieces p1.b1.r0 and p1.b1.r1 respectively onto the next subsequent disks D2 and D3 (and servers 2 and 0). This continues for each data block. The data servers may perform this process in parallel in order to reduce the time needed for the mirror remapping.

The remaining steps of FIG. 6 concern the work list execution (restripe) phase. The source data servers proceed down their respective work lists of block movement entries for each disk on each server in parallel and execute each entry according to the depth order. In this manner, the data servers handle all depth one entries first, followed by depth two entries, and so on, to avoid deadlock.

FIG. 6 shows the steps in this third phase as being performed by either a source data server, which supports the source storage disks and source data blocks, or a destination data server, which supports the destination storage disks and destination data blocks. For example, to execute the list entry <D1, L1>←<D6, L4> for data block P1.B17, the data block is to be moved from a source location 4 on source disk D6 on source data server 2 of the new layout to a destination location 1 on a destination disk D1 on a destination data server 1 of the new layout. These steps are implemented in the computer-implemented RSS program 60 located at each data server.

At step 92 in FIG. 6, the source data server reads the next entry on the "to-do" sub-list, and copies the listed data block from the source block location on the source disk into the source data server's memory. The source data server sends a message to the destination data server over the switched network 32 requesting to write the data block to a particular destination location on a particular destination disk (step 94 in FIG. 6).

The destination data server receives the write request and determines whether it is safe to write the data block to the destination location on the destination disk (step 96 in FIG. 6). It is possible in some instances that the contents of the destination location have not yet been transferred to their final destination. In this case, it is not safe to overwrite the contents with the source data block. Hence, at step 98 in FIG. 6, the destination data server postpones the write request until the contents in the destination location have been transferred and the move is logged. Because the work lists are constructed to permit parallel processing of the chains, normally a location's contents will have been copied and logged well before there is a write request for that location. Thus, in practice, the write requests are rarely postponed.

If it is safe to overwrite the contents in the destination location (i.e., the "yes" branch from step 96), the destination data server informs the mirroring data servers (i.e., those data servers that support the disks to which the mirror data resides now) to update their mirror copy of the data block being transferred to the destination server (step 100). For instance, when the data block P1.B17 is moved from source location 4 on source disk D6 to destination location 1 on destination disk D1, the associated redundancy pieces (not shown in FIG. 6) are moved from their original locations on disks D0 and D1 to their new locations on disk D2 and D3. Rather that reading the redundancy pieces from disks D0 and D1, the data from the copy of the primary on disk D6 may be used, thus eliminating the need to read the old mirror copies. The destination server 1 for block P1.B17 thus informs the mirroring data servers 2 and 3 of the pending movement of redundancy data. Movement of declustered redundancy pieces is performed in the same manner, wherein the primary source server seeks permission from the first mirroring server to send the data block to be written. Mirroring servers beyond the first rely on the first mirroring server to log updates, and so do not need to give permission for a write.

At step 102 in FIG. 6, the destination data server retrieves the data block from the persistent memory of the source data server by sending a message that the write request is approved. The source data server sends the data block over the switched network 32 to the destination server (step 104 in FIG. 6). The destination server writes the transferred data block to the destination block on the destination disk (step 106 in FIG. 6) and informs the source data server that the write is completed (step 108 in FIG. 6). When the source data server receives this message from the destination data server, and the messages from all of the mirroring data servers indicating that the redundancy pieces have been moved, the source data server records that the copy of the data block has been safely transferred (step 110 in FIG. 6).

When the source data server encounters a cycle on its list, it copies the contents of the source block into the spare block on the same disk. The source data server then shortens the cycle by this one operation, and passes the shortened cycle list to the next server in the cycle. The next server, acting now as a source server, moves the data contents from the next block (i.e., the source block) to the destination block (whose contents were previously copied to the spare block) using the phase three steps in FIG. 6. The second server shortens the cycle again by one operation, and passes the shortened list onto the next server. This continues until the cycle list returns to the starting server, which moves the contents out of the spare block into the destination block on the same disk.

The steps of FIG. 6 are continued in parallel at each of the data servers until all of the data blocks needing to be moved to conform to the new striping layout are in fact moved. This parallel operation is advantageous because it provides an efficient, time optimized approach to restriping the file server.

Another advantage to the parallel process is that it is configuration independent. As the size of the file server increases, the amount of network bandwidth between the data servers increases proportionally. Similarly, the number of disks and hence, the disk bandwidth increases with the file server size. Additionally, the total amount of file data increases proportionally to the size of the file server (and not faster). As a result, the file server is capable of restriping in time proportional to the total content per data server, and not to the total size of the file server. In theory, the file server can restripe thirty data servers, each with two disks, in the same amount of time that it can restripe three data servers, each supporting two disks.

According to another aspect of this invention, the continuous media file server is capable of handling failures during the restriping process. These failures fall into two categories: (1) component failures, such as a faulty storage disks or a faulty data server, and (2) whole system failures. The failures are handled in completely different ways. Component failures are handled using redundancy techniques supported by the mirrored data. When a disk fails in a way that causes loss of data, the file server ignores the faulty disk and continues as if it had not failed. The first mirroring disk assumes the role of the faulty disk and sends the data blocks to the requesting data servers for transfer to the new destination locations. Any data bound for the failed disk is instead sent only to the appropriate mirroring disks.

A component failure of an entire data server is treated as if all of the disks on the data server were faulty. However, the next consecutive data server assumes the task of executing the to-do list on behalf of the failed data server. In this manner, each to-do list is originally sent to two data servers so that a data server can take over the tasks of its predecessor in the event of failure.

In a component failure, the defective disk or defective data server can be replaced, if desired by the operator, following the restriping process. The data file server conducts a rebuilding process using the mirrored data to reconstruct the primary data on the new replacement storage disk or data server.

The second category of failures—whole system failures—is handled using a logging scheme. In the event of a system crash, such as via power failure, the restriping process is restarted at the last log entry. The logging scheme is rooted in each storage disk tracking which of its contents have been written to other disks, and which of the contents for which it holds the mirrored redundancy piece 0 have been written. Because the restriping process is performed in the order specified in the work list, keeping track of progress involves tracking a single work list index for the primary data block and another index for the first mirrored redundancy piece. These indices are stored in the header block of the disk in pre-reserved locations. The work list itself is also stored, either in the header block of the storage disk, or on the boot disk.

One approach is to log entries on both the primary and mirror disks for every data block copied, as well as for communication between the data servers holding the disks to verify that both log updates happened. This approach, however, imposes a significant time cost. Thus, another approach is to routinely log entries, but not for every block copy. To preserve consistency after a failure, it is only necessary to know that a data block has been copied by the time that the original location of the block has been overwritten. If a data block is copied from a source location but not logged, and the source location is not yet overwritten prior to system failure, all that will happen upon restart is that the data block will once again be copied, resulting in additional work but no loss of data. Thus, keeping the log updated is analogous to assuring that the block writes do not overrun the block reads.

Figure 9:
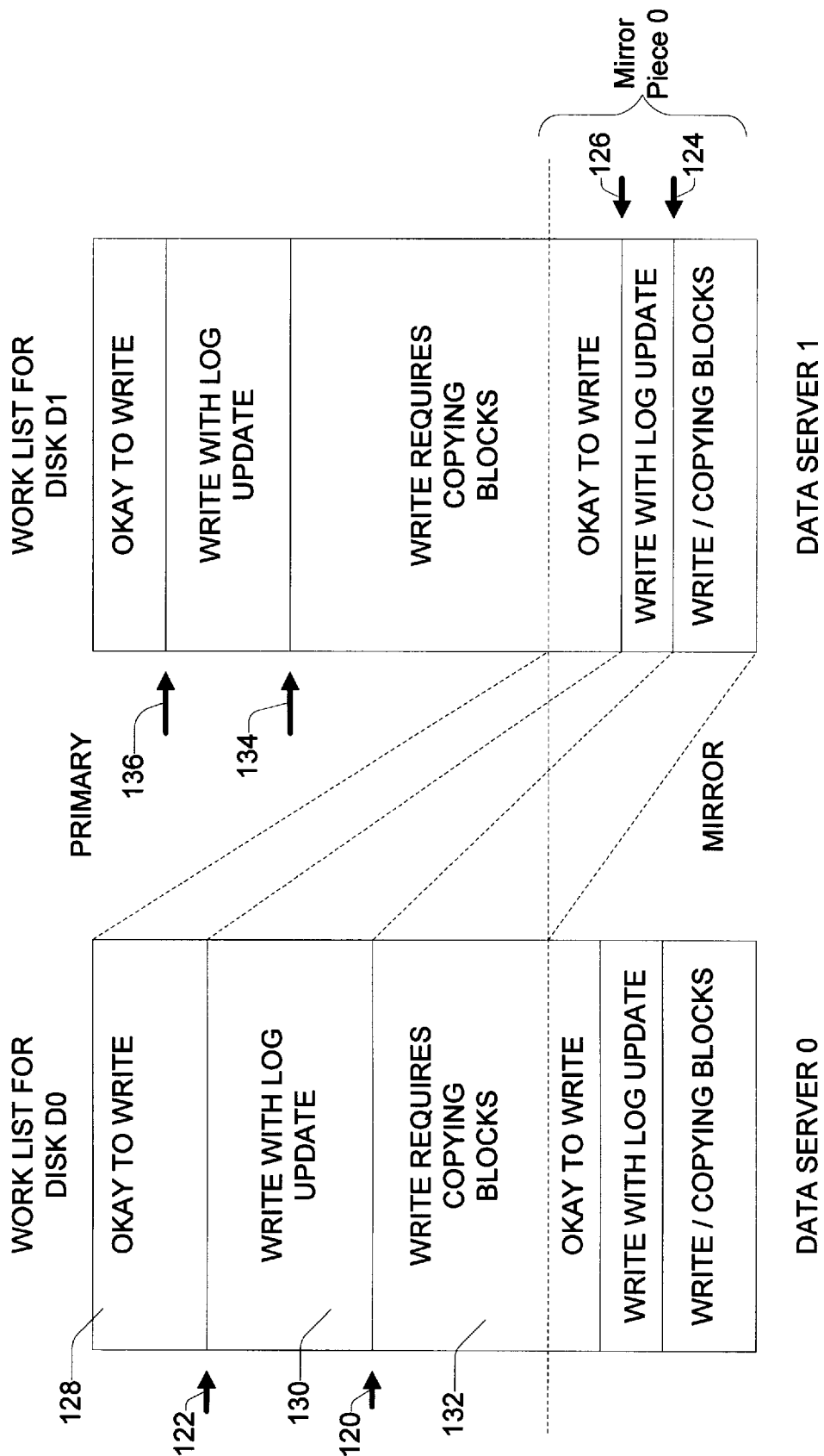
FIG. 9 is a diagrammatic illustration of two storage disks, and is provided to explain the use of pointers during the restriping process.

FIG. 9 shows work lists for storage disks D0 and D1 of the disk array 34 to illustrate one particular logging scheme that can be implemented in the file server. Disk D0 is supported by data server 0 and disk D1 is supported by data server 1. Each disk is divided into primary and mirror regions. There are two pointers in the work list for the primary region of disk D0: a last-block-write-completed pointer 120 (or simply, "write pointer") and a last-log-update-completed pointer 122 (or simply "log pointer"). Similarly, there are two pointers in the work list for the mirror region of storage disk D1 for the redundancy piece 0: a last-mirror-block-write-completed pointer 124 and a last-log-update-completed pointer 126. There are no work lists and no pointers kept for the other redundancy pieces 1 to n−1 (where "n" is the decluster factor).

The two primary pointers 120 and 122 define three sections of the primary work list. A first section 128 identifies all blocks on the work list that have been transferred. New data can be written into the locations of the transferred blocks because the original data has already been transferred to another storage disk and logged as being transferred. A second section 130 identifies all blocks that have been transferred to another storage location, but have not yet been logged as being transferred. A data write to any locations referenced in second section 130 requires that the log first be updated to reflect that the data blocks originally in the locations have been successfully moved. A third section 132 identifies all blocks that have not yet been copied and hence, data is prohibited from being written into the locations on the disk. A write to the locations referenced by section 132 requires copying the data blocks already stored in the locations to their destination locations and logging the move before write permission is granted.

As the storage disk D0 copies its contents to other disks, the last-block-write-completed pointer 120 advances in the work list. Whenever a log update happens, either because it was forced by a write being requested into a location referenced by section 130 or because of normal background log updating, the last-log-update-completed pointer 122 is advanced in the work list. Log updates can proceed asynchronously. A data server can continue transferring blocks out to other data servers and accepting data blocks onto itself as long as it does not write over a block that has not been copied and logged. For efficiency purposes, the file server may be configured to issue log updates before they are needed in order to allow writes to proceed. The time to update the log is overlapped with the time to write. It might also be useful to force log updates to reduce the amount of work necessary if the system fails. That is, when the two primary pointers 120 and 122 are closer together (indicating punctual log updating), there is less work needed following a whole system failure to return the file server to the appropriate place in the restriping process.

If the log is updated after each block write, the log pointer 122 will be tracking or slightly lagging the write pointer 120. Whenever a log update is initiated, the new value of the log pointer 122 will be the current value of the write pointer 120, but by the time that the log update completes, the write pointer 120 may have advanced.

The mirror piece 0 section on the work list for storage disk D1 is an exact reflection of the primary region of the work list for storage disk D0. The mirror pointers 124 and 126 are positioned at the corresponding locations to which the primary pointers 120 and 122 point, although they may become slightly out of synchronization because of differences in disk or network speeds.

The work list for storage disk D1 also keeps it own log and set of write and log pointers 134 and 136. The write pointer 134 and log pointer 136 for the work list of disk D1 are not necessarily at the same place in the work list as the pointers 120 and 122 of the work list of disk D0.

It is possible that the system will fail when the log has been updated on one of the primary or mirror disks, but not the other. This will not cause problems, however, because either the old or new value will result in correct behavior on restart. The data server waits until it has positive confirmation that the mirror log entry was written before allowing writes to proceed using the new log pointer.

It is noted that the file server may be configured without mirroring redundancy. In this case, the storage disks maintain only one log pointer. The file server can survive a system failure during restriping using the pointer. The file server cannot, however, survive loss of a disk drive because there is no redundant copy of the file data from which to work.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

We claim:

1. In a continuous media file server having multiple data servers with each data server supporting at least one storage disk, wherein data files are distributed across the data servers so that blocks of the data files are stored on each of the storage disks according to a present striping layout, a method for configuring the continuous media file server following a change in storage capacity, comprising the following steps:

determining a new striping layout of the data files across the storage disks which accounts for the change in storage capacity;

creating a list specifying movement of data from present locations on the storage disks conforming to the present striping layout to new locations on the storage disks conforming to the new striping layout;

distributing the list to the data servers; and executing the list, at the data servers, to move the data from the present locations to the new locations.

2. A method as recited in claim 1, wherein the determining step comprises allocating the blocks of the data files to the storage disks in sequential order.

3. A method as recited in claim 1, further comprising the step of evaluating, in an event that the storage capacity is reduced, whether the continuous media file server has sufficient capacity to store the data files.

4. A method as recited in claim 1, further comprising the step of constructing a map of the new striping layout.

5. A method as recited in claim 1, further comprising the step of constructing a bit map of the new striping layout having a bit entry representing each location on the storage disks in the new striping layout to assist in allocating data blocks to the locations of the new striping layout.

6. A method as recited in claim 1, wherein the creating step includes the step of assigning the data blocks to specific destination blocks on destination disks where the data blocks are to be moved according to the new striping layout.

7. A method as recited in claim 6, wherein the destination blocks include used blocks and at least some unused blocks, further comprising the step of first assigning the data blocks to the unused blocks on the destination disks and subsequently assigning the data blocks to the used blocks on the destination disks.

8. A method as recited in claim 1, further comprising the step of creating the list to include block movement summaries which specify a source disk and a source block located on the source disk where a particular data block presently resides and a destination disk and a destination block located on the destination disk where the particular block is to be moved according to the new striping layout.

9. A method as recited in claim 1, further comprising the step of deriving chains of data movements, each chain beginning with a block on a disk that is initially free and ending with a block on a disk that is finally free.

10. A method as recited in claim 1, further comprising the step of detecting cycles of data movements, each cycle beginning and ending with a same block on a disk.

11. A method as recited in claim 1, further comprising the following steps:
identifying data which resides on the same storage disk according to both the present striping layout and the new striping layout; and
omitting the identified data from the list.

12. A method as recited in claim 1, wherein the step of executing the lists is performed in parallel at the data servers.

13. A method as recited in claim 1, further comprising the step of communicating among the data servers to ensure that the data at the present locations are moved prior to being overwritten by the data being moved to the new locations.

14. A method as recited in claim 1, wherein the executing step comprises the following steps:
reading particular data from its present location on a source disk into a source data server supporting the source disk;
sending a write request from the source data server to a destination data server, the destination data server supporting a destination disk having the new location for the particular data;
determining, at the destination data server, whether the new location for the particular data is ready to be written to; and
if the new location is ready to be written to, transferring the particular data from the source data server to the destination data server and writing the particular data to the new location on the destination disk.

15. A method as recited in claim 14, further comprising the step of informing the source data server that the particular data has been written to the new location.

16. A method as recited in claim 1, wherein the data files are stored redundantly on the continuous media file server, further comprising the step of updating redundancy to reflect movement of the data.

17. A method as recited in claim 1, further comprising the step of logging events indicating when the data is moved to its new location.

18. A method as recited in claim 1, further comprising the following steps:
moving the data in a prescribed order from the storage disks;
logging events indicating when the data is moved to its new location; and
maintaining a pointer to each storage disks' work list indicating which data has been logged as being moved.

19. A method as recited in claim 1, further comprising the following steps:
moving the data in a prescribed order from the storage disks; and
maintaining a pointer to each storage disks' work list indicating which data was last transferred.

20. Computer-readable media having computer-executable instructions executable at the controller and the data servers for performing the steps of the method as recited in claim 1.

21. In a continuous media file server having a controller and multiple data servers with each data server supporting at least one storage disk, wherein data files are distributed across the data servers so that data blocks of the data files are stored on each of the storage disks, a method for configuring the continuous media file server following a change in storage capacity, comprising the following steps:
determining a new striping layout of the data files across the storage disks which accounts for the change in storage capacity;
creating a list with entries that assign the data blocks to destination blocks on destination disks where the data blocks are to be moved according to the new striping layout, individual list entries identifying a source block and a source disk where the data block presently resides as well as the destination block and the destination disk;
deriving chains of data block moves based on the list, each of the chains beginning with a destination block that is initially free prior to movement of any data blocks in the chain and ending with a source block that is finally free after movement of the data blocks in the chain;
detecting any cycles of data block moves within the list, each of the cycles beginning with a destination block and ending with a source block that is identical to the destination block;
constructing work lists for corresponding ones of the storage disks, the work lists containing individual links of the data block movement chains for performance by the respective data servers according to sequence of the links within the chains, at least some of the work lists further containing one or more of any said detected cycles;
distributing the work lists to the corresponding data servers;
for each list entry, performing in parallel at the data servers the following steps:
reading a particular data block from the source disk into a source data server responsible for the source disk;
sending a write request from the source data server to a destination data server, the destination data server supporting the destination disk;
determining, at the destination data server, whether the destination block is ready to be written to; and
if the destination block is ready to be written to, transferring the particular data block from the source data server to the destination data server and writing the particular data block to the destination block on the destination disk.

22. A method as recited in claim 21, further comprising the step of constructing a bit map of the new striping layout having a bit entry representing each location on the storage disks in the new striping layout to assist in allocating data blocks to the locations of the new striping layout.

23. A method as recited in claim 21, further comprising the step of omitting from the list any data blocks that reside on a storage disk which contains both the source block and the destination block.

24. A method as recited in claim 21, further comprising the step of informing the source data server that the particular data block has been written to the destination block.

25. A method as recited in claim 21, wherein the data files are stored redundantly on the continuous media file server, further comprising the step of updating redundancy to reflect movement of the data blocks.

26. A method as recited in claim 21, further comprising the step of logging an event indicating that the particular data block has been moved to the destination block.

27. Computer-readable media having computer-executable instructions executable at the controller and the data servers for performing the steps of the method as recited in claim 21.

28. In a continuous media file server having a controller and multiple data servers with each data server supporting at least one storage disk, wherein data files are distributed across the data servers so that data blocks of the data files are stored on each of the storage disks, a method for implementing a new storage configuration following a change in storage capacity, comprising the following steps:

determining a new striping layout of the data files across the storage disks which accounts for the change in storage capacity;

creating multiple lists for corresponding ones of the storage disks, each list having entries that specify movement of the data blocks from source blocks on source disk to destination blocks on destination disks where the data blocks are to be moved according to the new striping layout; and ordering the entries on the lists to dictate an order in which the data servers are to move the data blocks.

29. A method as recited in claim 28, further comprising the following steps:

deriving chains of data block moves based on the list, each of the chains beginning with a destination block that is initially free prior to movement of any data blocks in the chain and ending with a source block that is finally free after movement of the data blocks in the chain; and ordering the entries on the lists according to a sequence of the links within the chains.

30. A method as recited in claim 28, further comprising the following steps:

detecting any cycles of data block moves within the list, each of the cycles beginning with a destination block and ending with a source block that is identical to the destination block; and posting entire cycles to ones of the lists.

31. A method as recited in claim 28, further comprising the step of distributing the lists to the data servers.

32. A method as recited in claim 28, further comprising the step of evaluating, in an event that the storage capacity is reduced, whether the continuous media file server has sufficient capacity to store the data files.

33. A method as recited in claim 28, further comprising the step of omitting from the lists any data blocks that already reside on the destination disk.

34. A computer programmed to perform the steps recited in the method of claim 28.

35. A computer-readable medium having computer-executable instructions for performing the steps of the method as recited in claim 28.

36. In a continuous media file server having a controller and multiple data servers with each data server supporting at least one storage disk, wherein data files are distributed across the data servers so that data blocks of the data files are stored on each of the storage disks, a method for operating each data server during reconfiguration of the continuous media file server following a change in storage capacity, comprising the following steps:

receiving a list from the controller, the list having entries that assign the data blocks to destination blocks on destination disks where the data blocks are to be moved, the entries identifying a source block and a source disk where the data block presently resides as well as the destination block and the destination disk;

for each entry on the list, reading a particular data block from the source disk;

sending a write request to a destination data server which supports the destination disk; and in an event that the destination data server is ready to receive the data block, transferring the particular data block to the destination data server.

37. A method as recited in claim 36, further comprising the step of logging an event indicating when the particular data block is transferred to the destination block.

38. A method as recited in claim 36, further comprising the following steps:

reading and transferring data blocks in a prescribed order from the source disk;

logging events indicating that the data blocks are transferred to the destination blocks; and maintaining a pointer to the source disks' work lists indicating which data blocks have been logged as being transferred.

39. A method as recited in claim 36, further comprising the following steps:

reading and transferring data blocks in a prescribed order from the source disk; and maintaining a pointer to the source disk indicating which data block was last transferred.

40. A method as recited in claim 36, further comprising the following steps:

reading and transferring data blocks in a prescribed order from the source disk;

maintaining a pointer to the source disk indicating which data block was last transferred;

logging events indicating when the data blocks are transferred to the destination blocks; and maintaining a pointer to the source disk indicating which data blocks have been logged as being transferred.

41. A computer programmed to perform the steps recited in the method of claim 36.

42. A computer-readable medium having computer-executable instructions for performing the steps of the method as recited in claim 36.

43. In a continuous media file server having a controller and multiple data servers with each data server supporting at least one storage disk, wherein data files are distributed across the data servers so that data blocks of the data files are stored on each of the storage disks, a method for providing fault tolerance in an event of system failure during reconfiguration of the continuous media file server following a change in storage capacity, comprising the following steps:

constructing work lists for corresponding ones of the storage disks, the work lists specifying movement of data blocks from present locations on source disk to new locations on destination disks;

communicating among the data servers to transfer in parallel the data blocks from the source disks to the destination disks;

transferring the data blocks in an order specified in the work lists from the source disks;

maintaining first pointers to the source disks indicating which data blocks on the respective source disks were last transferred;

logging events indicating when the data blocks are transferred to the destination blocks; and maintaining second pointers to the source disks indicating which data blocks have been logged as being transferred.

44. A method as recited in claim 43, further comprising the step of commencing transfer of the data blocks located at the second pointers in an event that the continuous media server is recovering from system failure.

45. A continuous media file server, comprising:
multiple data servers, each data server supporting at least one storage disk, wherein data files are distributed across the data servers so that data blocks of the data files are stored on each of the storage disks according to a present striping layout;
a controller coupled to the data servers;
in an event that storage capacity of the media file server is changed, the controller being configured to determine a new striping layout of the data files across the storage disks which accounts for the change in storage capacity and to create a list specifying movement of data blocks from present locations on the storage disks conforming to the present striping layout to new locations on the storage disks conforming to the new striping layout; and
the data servers operating in parallel to execute the list to move the data blocks from the present locations to the new locations.

46. A continuous media file server as recited in claim 45, wherein the controller stripes the data blocks sequentially across the storage disks.

47. A continuous media file server as recited in claim 45, wherein the controller is configured to initially evaluate whether the continuous media file server has sufficient capacity to store the data files in an event that the storage capacity is reduced.

48. A continuous media file server as recited in claim 45, wherein the controller has a bit map of the new striping layout, the bit map having a bit entry representing each location on the storage disks in the new striping layout to assist in allocating data blocks to the locations of the new striping layout.

49. A continuous media file server as recited in claim 45, wherein the controller assigns the data blocks to specific destination blocks on destination disks where the data blocks are to be moved according to the new striping layout.

50. A continuous media file server as recited in claim 45, wherein the controller creates block movement summaries specifying movement of the data blocks from source blocks on source disks of the present striping layout to destination blocks on destination disks where the data blocks are to be moved according to the new striping layout.

51. A continuous media file server as recited in claim 47, wherein the controller derives chains of data block movements, each chain beginning with a destination block that is initially free and ending with a source block on a disk that is finally free.

52. A continuous media file server as recited in claim 50, wherein the controller detects cycles of data block movements, each cycle beginning with a destination block and ending with a source block that is identical to the destination block.

53. A continuous media file server as recited in claim 45, wherein:
the destination blocks include used blocks and unused blocks on the destination disk; and
the controller first assigns the data blocks to unused blocks on the destination disks and subsequently to used blocks in a selected order of the destination disks.

54. A continuous media file server as recited in claim 45, wherein the controller identifies certain data blocks which reside on storage disks which are the same under both the present striping layout and the new striping layout and omits these certain data blocks from the list.

55. A continuous media file server as recited in claim 45, wherein the data servers implement a protocol ensuring that the data blocks are moved prior to be overwritten.

56. A continuous media file server as recited in claim 45, wherein during execution of the list, a first one of the data servers reads a particular data block from a source disk and sends a write request to a second one of the data servers which supports a destination disk to which the data block is to be moved, the second data server retrieving the particular data block from the first data server and writing the particular data block to the destination disk.

57. A continuous media file server as recited in claim 56, wherein the second data server informs the first data server that the particular data block has been written to the destination disk.

58. A continuous media file server as recited in claim 45, wherein the data servers log events indicating that the data blocks are moved to the new locations.

59. A continuous media file server as recited in claim 45, wherein:
the data servers move the data in order from the storage disks; and
each of the storage disks maintains a pointer indicating which data blocks have been moved.

60. A continuous media file server as recited in claim 45, further comprising the following steps:
the data servers move the data in order from the storage disks and log events indicating when the data blocks are moved to the new locations; and
each of the storage disks maintains a pointer indicating which data blocks have been logged as being moved.

61. An interactive television system comprising the continuous media file server as recited in claim 45.

62. A network content provider comprising the continuous media file server as recited in claim 45.

63. A distributed control system for a continuous media file server, the continuous media file server having a controller and multiple data servers with each data server supporting at least one storage disk, wherein data files are distributed across the data servers so that data blocks of the data files are stored on each of the storage disks according to a present striping layout, the control system comprising:
a processor at the controller of the media file server, the controller-based processor being programmed to determine a new striping layout of the data files across the storage disks to account for a change in storage capacity and to create a list specifying movement of data blocks from present locations on the storage disks conforming to the present striping layout to new locations on the storage disks conforming to the new striping layout; and
a processor at each of the data servers, the data server-based processors being programmed to execute the list to move the data blocks from the present locations to the new locations.

64. An interactive television system comprising the distributed control system as recited in claim 63.

65. A network content provider comprising the distributed control system as recited in claim 63.

66. A computer-readable medium having computer-executable instructions for performing the following steps:

determining a new striping layout for distributing data files across multiple storage disks in a continuous media file server which has experienced a change in storage capacity, the new striping layout ensuring that data blocks of the data files are stored on each of the storage disks;

creating an executable list having entries that assign the data blocks to destination blocks on destination disks where the data blocks are to be moved according to the new striping layout; and ordering the entries on the list to dictate an order in which the data blocks are to be moved.

67. A computer-readable medium having computer-executable instructions for performing the following steps:

receiving a list describing movement of data blocks from data files from a present striping layout to a new striping layout, the present and new striping layouts prescribing distributed placement of the data blocks across multiple storage disks in a manner that the data blocks from each data file are stored on each of the storage disks, the list having entries identifying source blocks on source disks where the data blocks presently reside and destination blocks on destination disks where the data blocks are to be moved;

for each entry on the list, reading a particular data block from the source disk;

sending a write request to write the data block to the destination disk; and in an event that the destination disk is ready to receive the particular data block, transferring the particular data block to the destination disk.

\* \* \* \* \*